UNITED STATES PATENT OFFICE.

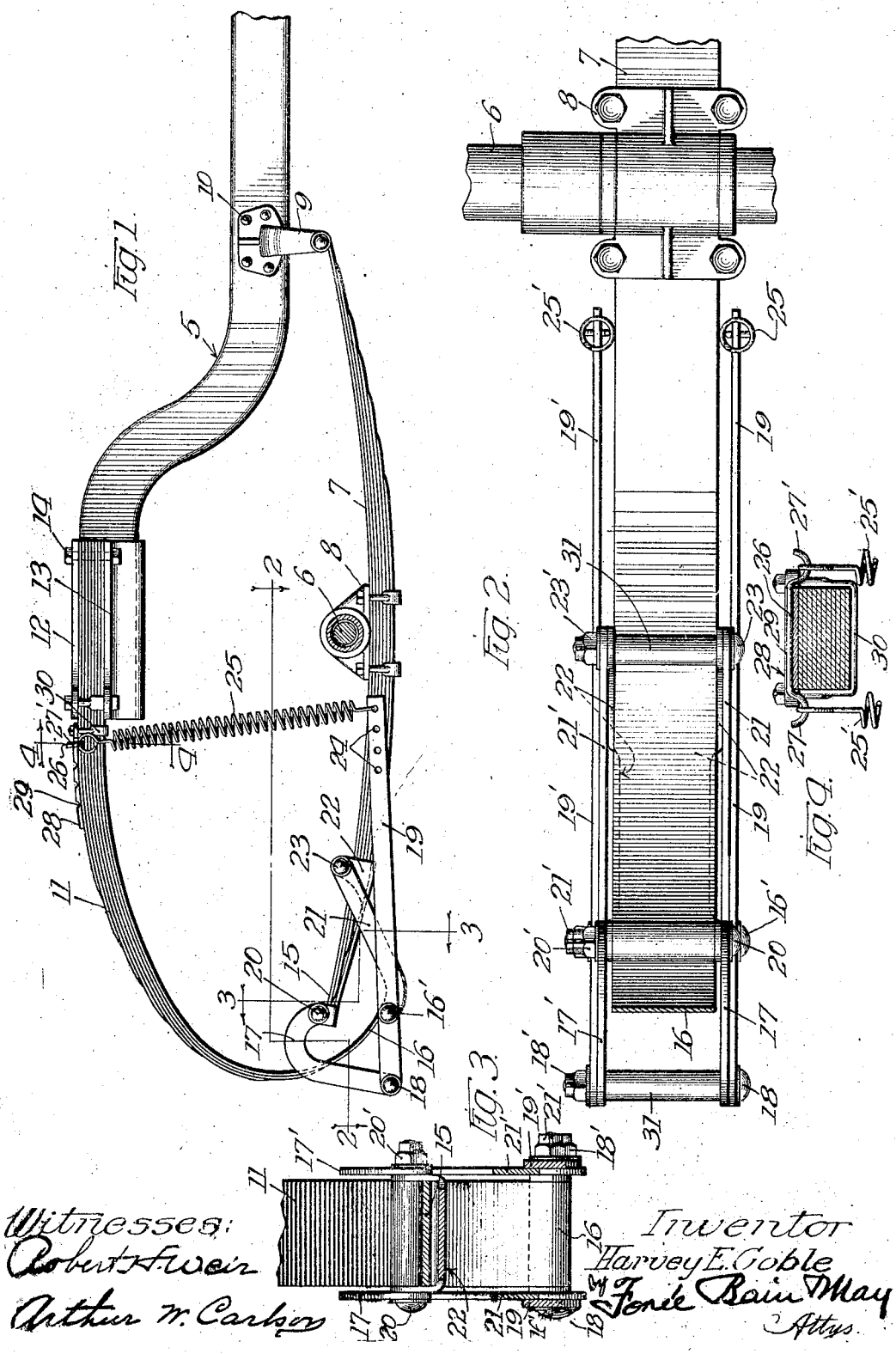

HARVEY E. COBLE, OF BENTON HARBOR, MICHIGAN, ASSIGNOR OF ONE-HALF TO JOHN STEINER, OF BENTON HARBOR, MICHIGAN.

SHOCK-ABSORBER.

1,201,805.  Specification of Letters Patent.  Patented Oct. 17, 1916.

Application filed January 20, 1916. Serial No. 73,136.

*To all whom it may concern:*

Be it known that I, HARVEY E. COBLE, a citizen of the United States, residing at Benton Harbor, in the county of Berrien and State of Michigan, have invented certain new and useful Improvements in Shock-Absorbers, of which the following is a specification.

My invention relates to vehicle shock absorbers, and more particularly, in some of its features, to shock absorbers of the type adapted for connection between two relatively stiff unyielding coöperating main springs that effect the usual resilient connection between the running gear and body or frame of an automobile.

My shock absorber is designed and intended to take up the smaller vibrations, that would otherwise be imparted to the vehicle body even by slight inequalities of the roadway, before the resiliency of the more powerful main springs would be materially brought into action. It is also intended and arranged for coöperative action with the main springs upon more extended relative movements thereof, in response to more pronounced inequalities or obstructions in the roadway.

One of the salient objects of my invention is to provide a shock absorber that is to be connected between the members of the usual springs of elliptic, or parti-elliptic springs of the leaf type, and capable of ready adjustment with relation thereto, whereby to temper its resistance or sensitiveness to displacement.

Another object of my invention is to provide a device, of the character described, wherein a very slight, relative movement of the connected main springs will cause a relatively large movement of an extensively long auxiliary spring of my interconnected shock absorber, thereby converting what would otherwise be a series of short harsh vibrations into relatively long bounding or undulating movements of the vehicle body, rendering easy, comfortable riding in the vehicle.

Other and further objects of my invention will become readily apparent, to persons skilled in the art, from a consideration of the following description when taken in conjunction with the drawings, wherein—

Figure 1 is a side elevation of a part of the chassis of an automobile, showing my shock absorber connected between two adjacent leaf springs, one of which is connected to the axle of the running gear and the other to the body or frame portion. Fig. 2 is a section, taken on line 2—2 of Fig. 1. Fig. 3 is a section, taken on line 3—3 of Fig. 1. Fig. 4 is a section, taken on line 4—4 of Fig. 1.

In all the views the same reference characters are employed to indicate similar parts.

5 is a part of the frame of an automobile, 6 is an axle. To the axle is connected a semi-elliptic leaf spring 7, by means of a clip 8, the forward end of the spring being connected to the frame 5 by means of a bracket 9, secured to the side of the frame, by bolts 10, or by any other suitable means. The quarter-elliptic spring 11, is secured at its forward end to the end of the frame 5 by parallel plates 12 and 13, and by the bolts 14. Ordinarily the outer free ends 15 and 16 of the respective springs are connected directly together or by means of a shackle, or otherwise.

My shock absorber is connected between the ends 15 and 16 of the respective springs and consists of a very resilient mechanism interposed between the main springs in the particular embodiment shown, so that when there is any relative vertical displacement between the frame or body 5 of the vehicle and the axle 6, the smaller vibrating effects are felt and taken up or absorbed by the shock absorber. The absorber consists, in the specific exemplification, of two curved shackle links 17—17', connected at 18 and 18' to the short ends of the tension bars 19 and 19', respectively. The other down-turned ends of the links 17—17', are connected to the outer end 15, of the spring 7, as at 20—20'. The end 16 of the spring 11 is provided with an eye which is connected to two shackle links 21—21' and to the tension bars 19—19', as at 16'. The other ends of these links are connected to ears 22—22', as at 23—23'. The ears 22—22' are on an extended end of a bar and are spaced inwardly of the end 20, of the spring 15, by any suitable means, and form a fulcrum point around which the links 21—21' are moved. The forward ends of the extension bars 19—19' are each provided with a series of longitudinally extending perforations 24, within which to adjust the auxiliary helical springs 25—25'. The springs 25—25' are secured at their upper ends to double hook-supports 26, each of which is provided with hooks 27—27', one on each of its ends, and which is adjustably secured on a plate 28. The plate 28 is provided with a series of transversely extending grooves 29, within which the support 26 may be placed in the act of adjusting the tension of the springs 25—25'. The plate 28 is secured to the upper and relatively stationary portion of the spring 11, by means of a clip 30. Spacing sleeves 31 are placed over the bolts in order to hold the links connected to the respective bolts, in proper spaced relation to prevent cramping; the eyes of the spring ends serve this purpose.

The operation of the device is as follows:—Relative vertical displacement of the springs 7 and 11 will cause corresponding movement of bars 19—19' on their pivotal points 16'. If the movement tends to separate the ends 15 and 16 of the respective ends, the springs 25—25' are elongated. Links 21 are pivoted to the tension bars 19, 19', the relative movement of the ends of the springs 7 and 11 are transmitted through them and as they will move on the pivotal points 18—18' to lift the rear ends of the tension bars, their forward ends will move downwardly to an extent much greater than the distance of displacement between the main springs, due to the difference in the leverage of the forwardly extending portion of the tension bars, from the pivotal point 16', with respect to the length of the rearwardly extending portion, from the pivotal point 18, thereby causing the auxiliary springs 25—25' to be considerably extended, which thus yieldingly resist the slight displacement of the lower spring 7 with reference to the upper spring 11. After the auxiliary springs 25—25' have thus been extended, to a point where they offer substantially the same degree of resistance as that interposed by the springs 7 and 11, they will then jointly coact with the leaf springs 7 and 11, in any further vertical displacement of the said springs. Thus it will be seen that the application of stress between the vehicle body and running gear, the springs 7 and 11 must be transmitted through my shock absorber, which has the effect of not only assisting the main leaf springs in performing their functions, but has the additional capability of taking up or absorbing smaller vibrations to which the larger or stiffer springs would be insensible.

The relative tension resistance of the auxiliary springs 25—25' may be regulated by moving the support 26 in the grooves 29, of the plate 28, or by moving the lower ends of the springs 25—25' in the respective perforations 24 of the tension arms 19—19', or by both movements so that by this means the relative tensions of the auxiliary springs may be adjusted to a nicety.

While I have herein shown and described a single embodiment of my invention, it is manifest that many changes may be made in the general arrangement and disposition of the parts, within the scope of the appended claims.

Having described my invention, what I claim is:—

1. In a device of the character described the combination with the frame and axle of an automobile, of a spring connection therefor comprising upper and lower members, one connected to the frame and one to the axle, and a shock absorber connected between the members, comprising a tension lever pivoted near one end, to the end of one of said members; a link connection between said pivotal connection and a relatively stationary part to prevent fore and aft movement of said members with respect to each other; a shackle, connecting the other member to the short end of said tension lever and an auxiliary spring, having a relatively long range of elastic movement, connected to the longer end of said tension lever and to said frame.

2. In a device of the character described the combination with the frame and axle of an automobile, of two springs, one connected to the frame and one to the axle, and a shock absorber connected between the springs, comprising a pair of tension levers, each pivoted near one of its ends to the end of one of said springs; a pair of links, connected to said pivotal point and to a relatively stationary point to prevent fore-and-aft movement of said springs; a pair of shackles connecting the other spring to the short ends of said tension levers, respectively, and a pair of auxiliary helical springs having relatively longer range of movement than the first mentioned springs, connected to the longer ends of said tension levers and to said frame.

In testimony whereof I hereunto set my hand in the presence of two subscribing witnesses.

HARVEY E. COBLE.

In the presence of—
F. E. COOMBS,
D. HOUSEHOLDER.